(12) United States Patent
Sikora

(10) Patent No.: US 11,519,718 B2
(45) Date of Patent: Dec. 6, 2022

(54) DEVICE AND METHOD FOR DETERMINING A MEASUREMENT OF A STRAND-SHAPED OBJECT

(71) Applicant: Sikora AG, Bremen (DE)

(72) Inventor: Harald Sikora, Bremen (DE)

(73) Assignee: Sikora AG, Bremen (DE)

( * ) Notice: Subject to any disclaimer, the term of this patent is extended or adjusted under 35 U.S.C. 154(b) by 0 days.

(21) Appl. No.: 17/263,336

(22) PCT Filed: Jul. 22, 2019

(86) PCT No.: PCT/EP2019/069673
§ 371 (c)(1),
(2) Date: Jan. 26, 2021

(87) PCT Pub. No.: WO2020/020820
PCT Pub. Date: Jan. 30, 2020

(65) Prior Publication Data
US 2021/0172727 A1    Jun. 10, 2021

(30) Foreign Application Priority Data

Jul. 26, 2018   (DE) ...................... 10 2018 118 097.7

(51) Int. Cl.
*G01B 11/08*    (2006.01)
*G01B 11/24*    (2006.01)
(Continued)

(52) U.S. Cl.
CPC ............ *G01B 11/08* (2013.01); *G01B 11/245* (2013.01); *G01B 11/2408* (2013.01);
(Continued)

(58) Field of Classification Search
CPC ... G01B 11/245; G01B 11/08; G01B 11/2408; G01B 11/2513; G01B 11/30; G01N 21/88
See application file for complete search history.

(56) References Cited

U.S. PATENT DOCUMENTS 4,201,476 A * 5/1980 Musto ................ G01B 11/04
356/640
4,432,648 A * 2/1984 Musto ................ G01B 11/02
356/640

(Continued)

FOREIGN PATENT DOCUMENTS

DE           198 06 288 A1    8/1999
DE     10 2009 000 834 A1    9/2010
(Continued)

*Primary Examiner* — Michael P LaPage
(74) *Attorney, Agent, or Firm* — Barclay Damon LLP

(57) ABSTRACT

A device for performing a measurement of a strand-shaped object comprises at least one transmission apparatus configured to emit measuring radiation onto the strand-shaped object, which reflects the measuring radiation. At least one receiving apparatus is configured to receive the measuring radiation reflected by the strand-shaped object. An evaluation apparatus is configured to determine at least one of (1) the diameter and (2) the outer contour of the strand-shaped object based on the measuring radiation received by the at least one receiving apparatus. At least one retroreflector is configured to surround at least a portion of the strand-shaped object and retroreflect at least some of the measuring radiation reflected by the strand-shaped object.

13 Claims, 4 Drawing Sheets

(51) Int. Cl.
    *G01B 11/25* (2006.01)
    *G01B 11/245* (2006.01)
    *G01B 11/30* (2006.01)
    *G01N 21/88* (2006.01)

(52) U.S. Cl.
    CPC .......... *G01B 11/2513* (2013.01); *G01B 11/30* (2013.01); *G01N 21/88* (2013.01)

(56) References Cited

U.S. PATENT DOCUMENTS

| | | | |
|---|---|---|---|
| 4,859,862 A * | 8/1989 | Planke | G01B 11/2433 250/559.22 |
| 6,858,836 B1 * | 2/2005 | Hartrumpf | G01B 11/08 250/559.19 |
| 2014/0062963 A1 * | 3/2014 | Matsushita | G06F 3/041661 345/175 |

FOREIGN PATENT DOCUMENTS

| | | | | |
|---|---|---|---|---|
| DE | 10 2011 050 052 A1 | 11/2012 | | |
| DE | 10 2016 111 044 A1 | 12/2017 | | |
| DE | 20 2016 008 526 U1 | 5/2018 | | |
| WO | WO-9638709 A1 * | 12/1996 | ......... | G01N 21/8806 |
| WO | WO-2016139155 A1 * | 9/2016 | ......... | G01B 11/0625 |

\* cited by examiner

DEVICE AND METHOD FOR DETERMINING A MEASUREMENT OF A STRAND-SHAPED OBJECT

CROSS REFERENCE TO RELATED INVENTION

This application is based upon and claims priority to, under relevant sections of 35 U.S.C. § 119, International Application No. PCT/EP2019/069673, filed Jul. 22, 2019, which claims priority to German Patent Application No. 10 2018 118 097.7, filed Jul. 26, 2018, the entire contents of which are hereby incorporated by reference.

TECHNICAL FIELD

The invention relates to a device for determining the diameter and/or the outer contour of a strand-shaped object, comprising at least one transmission apparatus for emitting measuring radiation onto the strand-shaped object, wherein the measuring radiation is reflected by the strand-shaped object. The device further comprises at least one receiving apparatus for receiving the measuring radiation emitted by the at least one transmission apparatus and reflected by the strand-shaped object. An evaluation apparatus is provided that is configured to determine the diameter and/or the outer contour of the strand-shaped object based on the measuring radiation received by the at least one receiving apparatus.

BACKGROUND

In devices of this kind, measuring radiation emitted by the transmission apparatus is reflected by the strand-shaped object, for example a metal pipe, and some of said measuring radiation makes its way back to the receiving apparatus, which is for example arranged in the same location as the transmission apparatus. Based on a delay time measurement, the evaluation apparatus can measure the distance from the transmission and receiving apparatuses to the surface of the strand-shaped object. If this measurement is carried out from opposite sides of the strand-shaped object, for example, the diameter of the pipe can be determined. Transmission apparatuses used in devices of this kind have a larger radiation angle, wherein a majority of the measuring radiation emitted is reflected in different directions in space by the strand-shaped object and therefore does not reach the receiving apparatus and thus cannot be provided for the evaluation.

Proceeding from the explained prior art, the object of the invention is therefore to provide a device of the aforementioned type with which, in a simple manner, more comprehensive measurement of the outer contour of a strand-shaped object is possible.

BRIEF SUMMARY OF THE INVENTION

With regard to a device of the aforementioned type, the invention solves the object in that at least one retroreflector is provided, which surrounds the strand-shaped object at least in portions and which retroreflects all or some of the measuring radiation reflected by the strand-shaped object.

The strand-shaped object to be measured may for example have a substantially circular-cylindrical outer contour. It may be substantially opaque to the measuring radiation emitted by the at least one transmission apparatus. For example, the strand-shaped object may be a tubular object, such as a metal pipe, in particular a steel pipe. However, it may also be a solid strand-shaped object, for example a metal bolt. The strand-shaped object may be conveyed in the longitudinal direction through the measurement region of the transmission and receiving apparatus and measured in the process. For this purpose, the device according to the invention may comprise a suitable conveying apparatus.

According to an embodiment, at least one retroreflector that at least partially surrounds the strand-shaped object to be measured in the circumferential direction is provided. The retroreflector may surround the object to be measured substantially completely in the circumferential direction, in particular except for the emission and receiving apparatuses. The strand-shaped object to be measured may in particular be arranged concentrically with respect to the at least one retroreflector. Electromagnetic measuring radiation is emitted by the at least one transmission apparatus in the direction of the strand-shaped object to be measured and is at least partially reflected by the strand-shaped object. As already explained, the at least one transmission apparatus emits the measuring radiation at a specific radiation angle. A small fraction of the measuring radiation, namely the fraction that is incident at an angle of incidence of 0°, i.e. perpendicularly, on the outer contour of the strand-shaped object, is reflected back thereby at the same reflection angle of 0°, i.e. again perpendicularly, for example directly to the at least one receiving apparatus arranged in the same location as the at least one transmission apparatus. However, the substantially larger portion of the measuring radiation emitted by the at least one transmission apparatus and incident on the strand-shaped object has an angle of incidence $\neq 0°$ and is therefore also reflected by the object at a reflection angle $\neq 0°$.

In an embodiment, this fraction of the measuring radiation, which in the prior art is frequently not taken into account or is very difficult to evaluate, impinges on the at least one retroreflector. At least some of the measuring radiation that impinges on the retroreflector is retroreflected thereby. The retroreflector according to the invention reflects at least some of the incident radiation substantially in the direction from which the radiation came, substantially regardless of the direction of incidence and the orientation of the reflector. The radiation fractions reflected by the strand-shaped object at a reflection angle of $\neq 0°$ are therefore at least partially reflected back onto the same surface region of the strand-shaped object from which they were previously reflected on their way to the retroreflector. The (second) angle of incidence of these radiation fractions on the strand-shaped object therefore corresponds to their previous reflection angle. Accordingly, these radiation fractions are reflected back to the at least one transmission apparatus and thus to the at least one receiving apparatus, which is arranged for example in the same location, at the same (second) reflection angle. In summary, in this way, radiation fractions that would not make their way back to the receiving apparatus if a conventional reflector were used can make their way back to the at least one receiving apparatus, and can therefore be detected and evaluated in a simple manner, when they impinge on the retroreflector. Accordingly, the outer contour can be comprehensively detected in the surface region of the strand-shaped object to be measured that is irradiated by means of the at least one transmission apparatus. According to the invention, it is not necessary for the retroreflector to retroreflect all incident radiation fractions. Instead, it is also conceivable for just some of the radiation incident on the retroreflector to be reflected back thereby in the same direction from which it came, whereas another portion of the incident radiation is reflected in other directions and thus cannot be used for the evaluation in some circumstances. This is acceptable, provided that the portion of incident radiation retroreflected in the original direction has a sufficient intensity for the evaluation.

In an embodiment, the evaluation apparatus may for example measure the delay time of the measuring radiation between the time at which it is emitted by the at least one transmission apparatus and the time at which it is received by the at least one receiving apparatus. Since the position in space of the transmission and receiving apparatuses and of the retroreflector are known, the distance from same to the outer counter of the strand-shaped object irradiated by means of the transmission apparatus can be determined. In particular, this makes it possible to precisely determine the outer contour in the irradiated region, for example deviations from the predefined shape, for example a circle. In this way, surface defects such as dents or bumps can be reliably detected on account of the distance altered thereby to the measuring apparatus. The diameter of the strand-shaped object can also be determined, in particular if the distance between the transmission and receiving apparatus and surface of the strand-shaped object is measured from opposite sides. An evaluation of this kind is known per se.

The retroreflector may be a contiguous reflector. However, it may also be formed of a plurality of individual, separate reflector portions. So-called corner reflectors, for example in the form of triple mirrors, may for example be considered as retroreflectors. Corner reflectors having two mirrors arranged at an angle to one another may also be considered. Retroreflective foils or the like would also be conceivable. As already mentioned, reflectors that reflect back at least some of the incident radiation to their point of origin may also be considered. Reflectors having a highly roughened surface or reflectors having a spherical surface would be conceivable, for example.

In an embodiment, at least one transmission apparatus and at least one receiving apparatus may be arranged substantially in the same location. The transmission region of the transmission apparatus and the reception region of the receiving apparatus may therefore be substantially identical. This facilitates evaluation of the measurement results.

According to an embodiment, at least one transmission apparatus and at least one receiving apparatus may be formed by at least one transceiver. In this case, the transmission and receiving apparatus are combined into one component and thus handily arranged in the same location. In particular, all transmission apparatuses and all receiving apparatuses may in each case be formed in pairs by transceivers.

According to another embodiment, a plurality of transmission apparatuses arranged so as to be distributed over the circumference of the strand-shaped object and a plurality of receiving apparatuses arranged so as to be distributed over the circumference of the strand-shaped object may be provided. For example, they may be arranged so as to be evenly distributed over the circumference of the strand-shaped object to be measured. By virtue of the above-mentioned embodiment, the entire circumference of the strand-shaped object can be reliably covered and therefore the outer contour can be completely measured and the diameter can be measured at various points. As a result, any ovality or the like can be reliably detected. In particular, as many transmission apparatuses as receiving apparatuses may be assigned to one another in pairs, such that one receiving apparatus receives measuring radiation from one assigned transmission apparatus in each case. In this case, one transmission apparatus and one receiving apparatus may in each case be arranged in pairs in substantially the same location.

Equally, a number of transceivers, which form a transmission apparatus and a receiving apparatus in each case, may correspond to the number of transmission or receiving apparatuses. For example, at least three transmission apparatuses and at least three receiving apparatuses, in particular three transceivers, may be provided. If three transmission apparatuses and three receiving apparatuses, in particular three transceivers, are provided, these can be arranged at an angular distance of 120° relative to one another. An arrangement of this kind is advantageous, since, on the one hand, the entire outer contour can be reliably detected and, on the other hand, mutual interference of the transmission and receiving apparatuses, in particular caused by the reception of measuring radiation from transmission apparatuses other than the transmission apparatus assigned to a receiving apparatus, can be reliably prevented.

In an embodiment, at least three transmission apparatuses are arranged so as to be distributed over the circumference of the strand-shaped object and at least three receiving apparatuses arranged so as to be distributed over the circumference of the strand-shaped object, for example at least three transceivers, may be provided. In addition, the evaluation apparatus may be designed to determine the position of a surface defect on the strand-shaped object from a comparison of the measuring radiation received by the at least three receiving apparatuses. As already explained, by using at least three transmission and receiving apparatuses, the entire circumference of the strand-shaped object can be reliably covered and therefore the outer contour can be completely measured. A surface defect such as a dent or bump generates a corresponding measurement signal in the measuring apparatus or apparatuses, which detect measuring radiation reflected by the surface defect. If, for example, three transmission and receiving apparatuses are arranged so as to be distributed over the circumference of the strand-shaped object, for example at a distance of 120° in each case, in conjunction with a retroreflector that surrounds the object to be measured substantially completely in the circumferential direction, in particular except for the transmission and receiving apparatuses, radiation reflected by a surface defect can be received by two of the three receiving apparatuses, but not the third of the three receiving apparatuses. Based on the comparison of the measurement data from the at least three receiving apparatuses, the evaluation apparatus can then reliably discriminate which receiving apparatuses detect the surface defect and from this ascertain the position of the surface defect.

According to another embodiment, at least two receiving apparatuses and at least one transmission apparatus arranged between the at least two receiving apparatuses may be provided, and the evaluation apparatus may be designed to determine the position of a surface defect on the strand-shaped object from a temporal comparison of the measuring radiation received by the receiving apparatuses. Depending on whether a surface defect is closer to a first or second of the at least two receiving apparatuses, the receiving apparatus closer to the surface defect will receive measuring radiation reflected by the surface defect before the receiving apparatus further away from the surface defect. The temporal comparison of the measurement signals from the receiving apparatuses can therefore also be used to determine the position of the surface defect. The transmission apparatus may also be part of a transceiver. The receiving apparatuses may in particular be arranged symmetrically with respect to the transmission apparatus, i.e. in particular at the same (angular) distance from the transmission apparatus. This facilitates the evaluation, since the measurement signals from the receiving apparatuses are identical in the case of a surface of the strand-shaped object that is perfectly circular, for example.

In the above-mentioned embodiment, as well as in some or all of the other embodiments according to the invention, it may be advantageous or necessary to actuate the receiving apparatus(es) and/or the transmission apparatus(es) in a phase-synchronous manner. In particular, if the frequency of the measuring radiation emitted by the at least one transmission apparatus is modulated, for example by means of sawtooth frequency modulation, it may also be advantageous or necessary to actuate the receiving apparatus(es) and/or the transmission apparatus(es) in a frequency-synchronous manner. Phase-synchronous and/or frequency-synchronous actuation is known per se to a person skilled in the art.

According to another embodiment, the at least one retroreflector may be designed to be circular in cross-section at least in portions. It may in particular be substantially completely circular in cross-section. For example, the at least one retroreflector may have the shape of a circle. The retroreflector may for example be arranged in a plane that lies substantially perpendicularly to the longitudinal axis of the strand-shaped object. If the outer contour of the strand-shaped object has a perfectly circular cross-section, each portion of the retroreflector is therefore at the same distance from the outer contour of the strand-shaped object. In this way, deviations from a predefined circular cross-section shape of the strand-shaped object can be identified in a particularly simple manner.

However, it is also possible for the cross-section of the at least one retroreflector to deviate from a circular shape at least in portions. Furthermore, it is also possible for the at least one retroreflector to comprise a plurality of discrete reflector portions arranged so as to be offset relative to one another in the radial direction, preferably offset in a stepped manner. The plurality of reflector portions may each be circular in cross-section. However, they may also have a shape that deviates from the shape of a circle in cross-section. The reflector portions are accordingly each retroreflective. The offset in the radial direction relates to the longitudinal axis of the strand-shaped object. The different reflector portions, in particular reflector portions arranged adjacently to one another, are therefore at different distances from the surface of the strand-shaped object to be measured, for example a circular-cylindrical object. By virtue of this embodiment, various regions of the outer contour of the strand-shaped object can be metrologically discriminated in a particularly reliable manner. In the case of a retroreflector with a uniform radius and completely circular cross-section, for example, there is the problem that in each case two surface regions of the outer contour of the, for example circular-cylindrical, strand-shaped object have the same angle of incidence and thus reflection angle for the measuring radiation. This results in said radiation fractions having an identical delay time and thus impinging on the receiving apparatus at the same time. If delay time deviations occur because one of the surface regions comprises a defect, it is thus impossible to determine which of the two surface regions has the defect. This problem is solved by the above-mentioned embodiment in that, on account of the corresponding embodiment of the retroreflector, the delay times of such radiation fractions are intentionally shifted relative to one another.

Therefore, with regard to the position of the transmission and receiving apparatuses, an asymmetrical embodiment of the retroreflector is conceivable, in particular. In particular, the at least one retroreflector may comprise a plurality of discrete reflector portions, wherein the plurality of reflector portions are arranged asymmetrically along a, for example, circular, circumferential line with respect to the at least one transmission apparatus and the at least one receiving apparatus, such that the delay times of radiation fractions reflected by the reflector portions are in turn intentionally shifted relative to one another. An asymmetrical arrangement in particular means that the reflector portions, which are for example arranged on a circular path that is concentric with respect to the strand to be measured, are at different angular distances from the at least one transmission apparatus and the at least one receiving apparatus. Reflector portions that are irradiated with measuring radiation at the same angle of incidence and thus the same reflection angle by surface portions of the strand-shaped object can therefore be metrologically discriminated in as reliable a manner as when the reflector portions are arranged so as to be offset relative to one another in the radial direction, since they produce radiation echoes at different times in the case of a strand-shaped object having a uniform outer diameter.

According to another embodiment, the measuring radiation emitted by the at least one transmission apparatus may be terahertz radiation or gigahertz radiation. Measuring radiation in the terahertz or gigahertz frequency range, for example measuring radiation in the radar frequency range, is particularly well suited for the measurement according to the invention. Transmission and receiving apparatuses of this kind are largely insensitive to interference, in particular with regard to high temperatures, dirt, vapor production, etc., which occurs in particular during production of steel pipes. It is therefore possible for the strand-shaped object to be measured to be measured immediately after manufacture such that it is possible to respond as quickly as possible to any undesired geometrical discrepancies by altering the production parameters. By way of example, at this time, steel pipes have a high temperature and are regularly cooled at the same time as well, for example using water. This leads to strong evaporation and thus to a less suitable measuring environment for optical measuring apparatuses.

BRIEF DESCRIPTION OF THE DRAWINGS

Exemplary embodiments of the invention are explained in greater detail below based on figures. Schematically.

The same reference numbers refer to the same objects in the figures unless indicated otherwise.

DETAILED DESCRIPTION OF THE INVENTION

Figure 1:
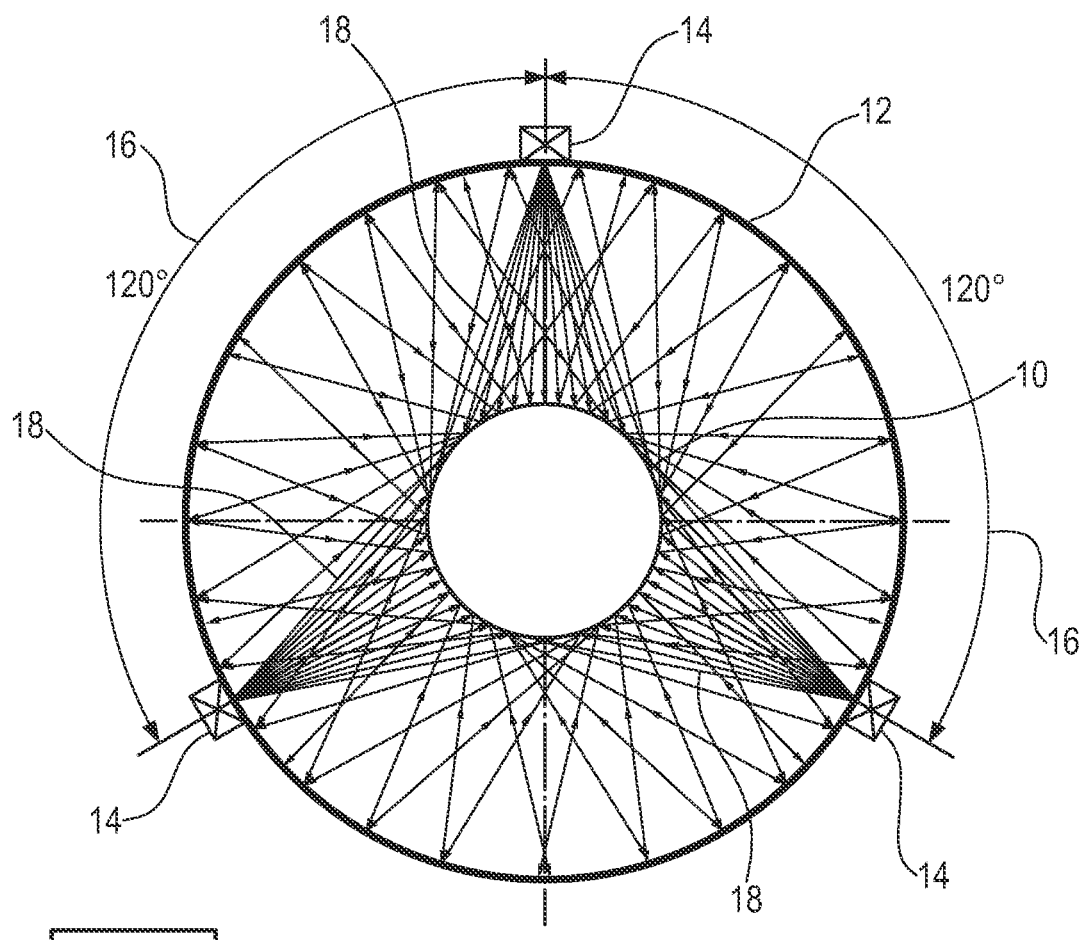
FIG. 1 illustrates a cross-sectional view of an embodiment of a device for determining the diameter and/or the outer contour of a strand-shaped object (device)

FIG. 1 shows a strand-shaped object 10, in the example shown a metal pipe 10 such as a steel pipe 10, in cross-section. The strand-shaped object 10 is conveyed in the direction of its longitudinal axis by the device according to the invention, in FIG. 1 perpendicularly into the drawing plane. The device according to the invention may comprise a corresponding conveying apparatus for this purpose. In the example shown, the strand-shaped object 10 has a circular outer contour in cross-section. The strand-shaped object 10 is surrounded by a retroreflector 12, which is also circular in cross-section. The strand-shaped object 10 is arranged substantially concentrically with respect to the retroreflector 12. In the example shown, the retroreflector 12 surrounds the strand-shaped object 10 substantially completely in the circumferential direction, except for measuring openings for transceivers 14 (three in the example shown), which each comprise a transmission apparatus and a receiving apparatus for terahertz radiation or gigahertz radiation. In the example shown, the transceivers 14 are arranged so as to be distributed evenly over the circumference of the retroreflector 12 and thus of the strand-shaped object 10 as well, in each case at an angular distance of 120°, as shown in FIG. 1 by the reference sign 16 for two of these distances.

As illustrated in FIG. 1 by the large number of arrows, the transmission apparatus of each transceiver 14 emits measuring radiation 18 at a specific radiation angle, in the example shown approximately 40°. Substantially all of this measuring radiation 18 is reflected by the surface of the strand-shaped object 10, as illustrated in FIG. 1 by the array of arrows. In the case of an angle of incidence $\neq 0°$ on the strand-shaped object 10, the measuring radiation reflected by the surface of the strand-shaped object 10 arrives at the retroreflector 12 at the same reflection angle $\neq 0°$ on account of the corresponding reflection, and each radiation fraction is reflected back by the retroreflector in the same direction, i.e. back to the point on the surface of the strand-shaped object 10 on which the measuring radiation was previously reflected. Accordingly, after being reflected on the surface of the strand-shaped object 10 once more, the measuring radiation then makes its way back along its original route to the transceiver 14 and thus to the relevant receiving apparatus, where it is detected as a measurement result.

Figure 2:
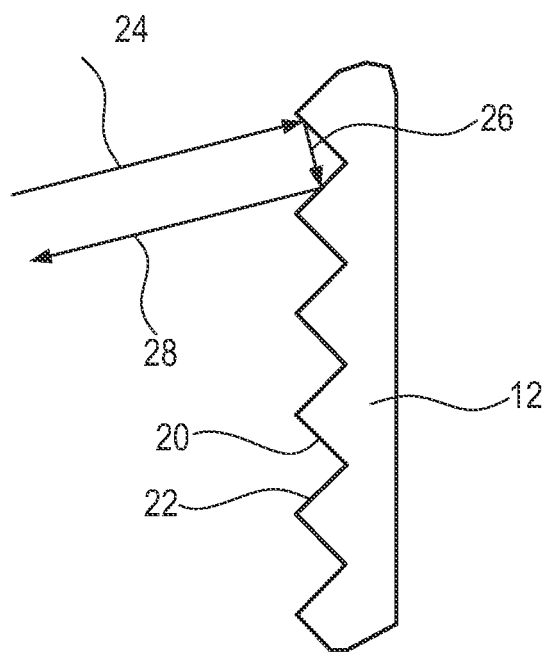
FIG. 2 illustrates an enlarged view of an embodiment of a retroreflector of the device from FIG. 1.

FIG. 2 shows an enlarged representation of one possible embodiment of the retroreflector 12. In the example shown, said retroreflector is implemented as an array of corner reflectors forming the inner side of the retroreflector 12 and each comprising two reflector mirrors 20, 22 arranged at an angle of 90° to one another. When measuring radiation arrives at the retroreflector 12, as shown in FIG. 2 by the arrow 24, it is reflected by both reflector mirrors 20, 22 and, regardless of the angle of incidence on the reflector mirrors 20, 22, in the same direction from which the measuring radiation previously came, as illustrated in FIG. 2 by the arrows 26 and 28. For reasons of clarity, the circular curvature of the retroreflector 12 has not been shown in the enlarged representation in FIG. 2.

The device according to the invention from FIG. 1 further comprises an evaluation apparatus 30, which is connected via cables (not shown) to the transceivers 14. In particular, the measurement results of the receiving apparatuses of the transceivers 14 are applied to the evaluation apparatus 30 and, based on these results, the evaluation apparatus 30 can computationally determine the diameter and/or the outer contour of the strand-shaped object 10, in particular based on a delay time measurement of the measuring radiation 18 when the position in space of the transceivers 14 and retroreflector 12 is known.

Figure 3:
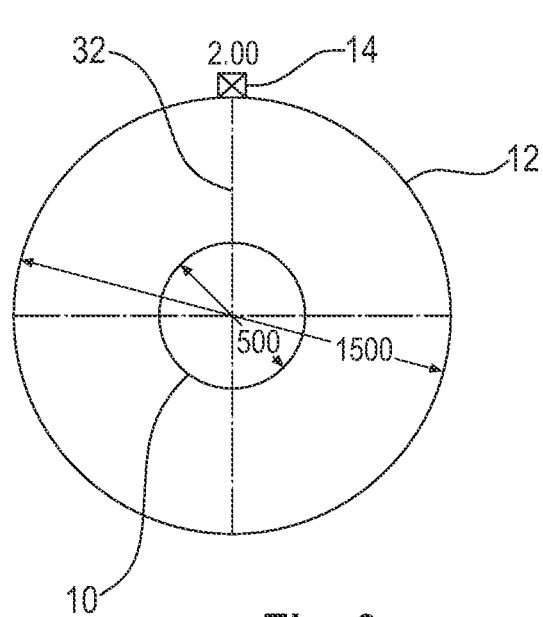
FIG. 3 illustrates an example of evaluation of the measurement results using the device.

This will be explained in greater detail with reference to the FIGS. 3 to 6, in which, for reasons of clarity, only one of the transceivers 14 is shown. As can be seen in the example shown in FIG. 3, which has been selected merely for illustrative purposes, the strand-shaped object 10 has a diameter of 500 mm and the retroreflector 12 has a diameter of 1500 mm. In FIG. 3, the radiation fraction 32 that impinges perpendicularly on the strand-shaped object 10 can be seen to be reflected back directly to the emitting transceiver 14, in particular the receiving apparatus of the transceiver 14, without being reflected on the retroreflector 12 on account of an angle of incidence of 0°. In the example shown, the distance covered by said radiation fraction 32 between being emitted by the transceiver 14 and being received by the transceiver 14 is therefore 2.00 m (2000 mm).

Figure 4:
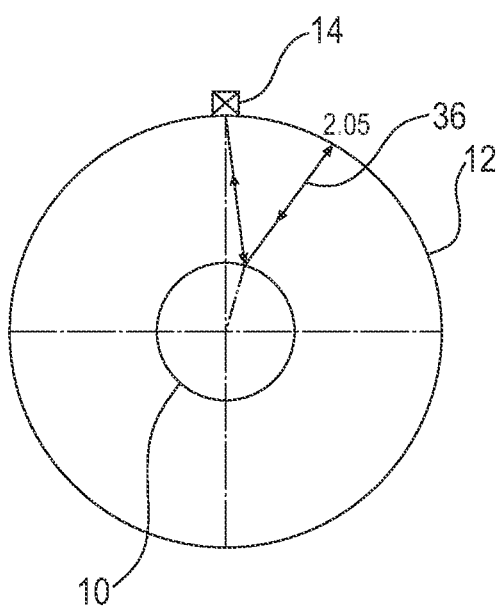
FIG. 4 illustrates another example showing the evaluation of the measurement results using the device.
Figure 5:
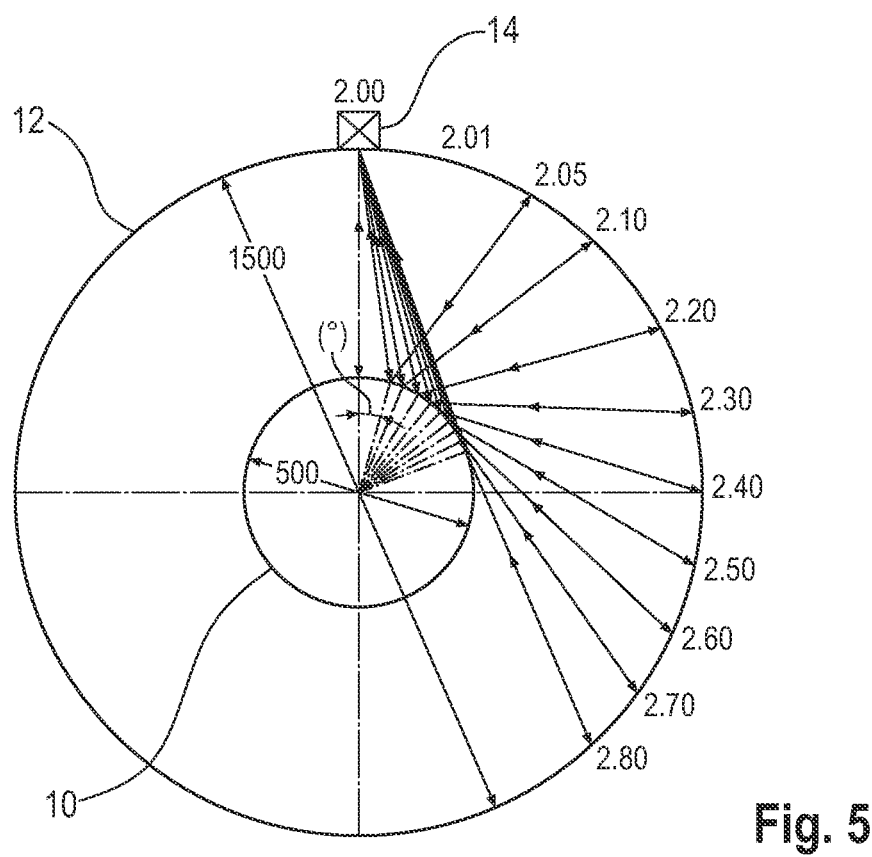
FIG. 5 illustrates another example showing the evaluation of the measurement results using the device.
Figure 6:
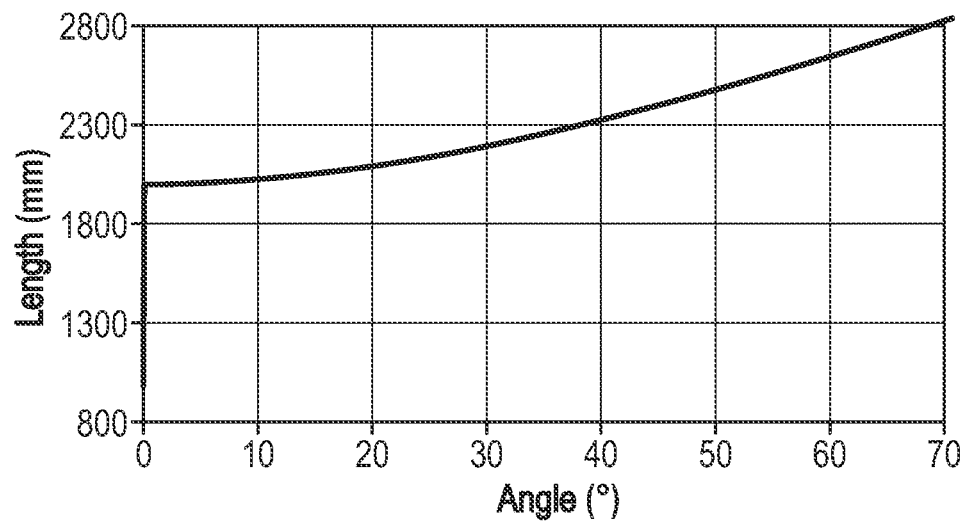
FIG. 6 illustrates an embodiment of a graphical representation of the distance covered by the measuring radiation plotted over the angle of incidence on the strand-shaped object to be measured.

As can be seen in FIGS. 4 and 5, the distance covered increases as the angle of incidence on the strand-shaped object 10 and corresponding reflection on the retroreflector 12 increases. This is indicated for a radiation fraction in FIG. 4 by the arrows 34, 36. In the example shown, the distance covered by this radiation fraction between being emitted by the transceiver 14 and being received by the transceiver 14 is 2.05 m (2050 mm). In FIG. 5, this is demonstrated for a whole series of other radiation fractions, with the distance covered increasing to 2.80 m (2800 mm) in the extreme case of the almost tangential incidence on the strand-shaped object 10. This can also be seen in the graph in FIG. 6, where the total distance covered (length) in millimeters is plotted over the angle of incidence in degrees. This increase in the distance can be taken into account accordingly by the evaluation apparatus 30 during evaluation of the measurement signals. As a result, deviations from the distance expected in each case for a perfectly circular strand-shaped object 10 and thus the measured delay time can be used to identify surface defects.

Figure 7:
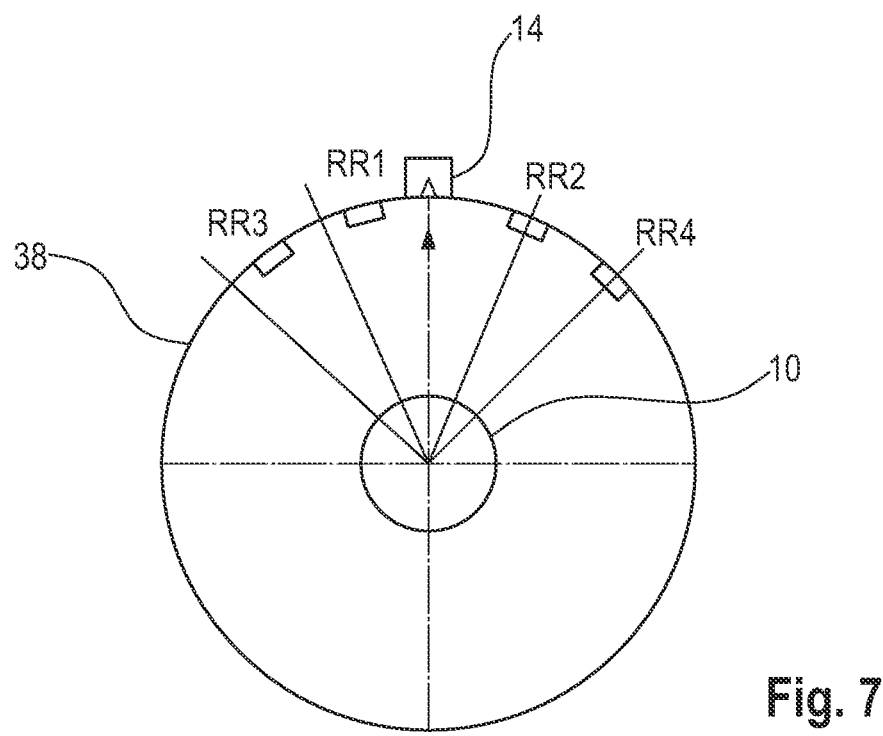
FIG. 7 illustrates s cross-sectional view of an embodiment of the device.
Figure 8:
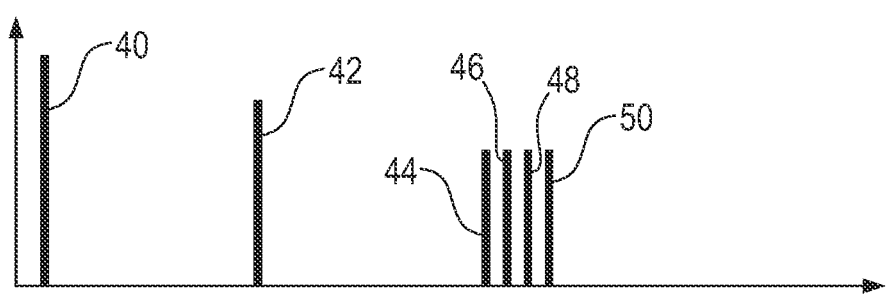
FIG. 8 illustrates an embodiment of a graphical representation showing measurement pulses of the device according to FIG. 7 plotted over time.

FIG. 7 shows a further exemplary embodiment of a device according to the invention. For reasons of clarity, only one transceiver 14 is shown here. Of course, a plurality of transceivers could be provided and distributed over the circumference of the U-shaped object 10. In this exemplary embodiment, the retroreflector comprises a plurality of discrete retroreflector portions RR1, RR2, RR3 and RR4. The retroreflector portions RR1, RR2, RR3 and RR4 are arranged so as to be distributed in an asymmetrical manner with respect to the transceiver 14 on a circular circumferential line 38. As a result, radiation fractions reflected by the different retroreflector portions RR1, RR2, RR3 and RR4 are received at different times by the receiving apparatus of the transceiver 14 even in the case of a strand-shaped object 10 having a constant diameter. As a result, the radiation fractions can be reliably discriminated during evaluation. This is illustrated in the graph in FIG. 8, in which the intensity of the radiation transmitted or received is plotted over time. Reference sign 40 indicates a transmission pulse of the transceiver 14, reference sign 42 indicates a received radiation echo of the radiation fraction reflected directly back to the transceiver 14 from the strand-shaped object 10. Reference signs 44, 46, 48 and 50 indicate radiation echoes of the radiation fractions reflected back by the respective reflector portions RR1, RR2, RR3 and RR4. This result could also be achieved, for example, if retroreflector portions arranged for example symmetrically with respect to the transceiver 14 on the circumferential line 38 were offset relative to one another in the radial direction, i.e. not all arranged on the circumferential line 38.

LIST OF REFERENCE SIGNS

10 Strand-shaped object
12 Retroreflector
14 Transceiver
16 Angular distance
18 Measuring radiation
20 Reflector mirror
22 Reflector mirror
24 Arrow
26 Arrow
28 Arrow
30 Evaluation apparatus
32 Radiation fraction
34 Arrow
36 Arrow
38 Circumferential line
40 Transmission pulse
42 Radiation echo
44 Radiation echo
46 Radiation echo
48 Radiation echo
50 Radiation echo

The invention claimed is:

1. A device for performing a measurement of a strand-shaped object, the device comprising:
   at least one transmission apparatus configured to emit measuring radiation along an input-output optical axis and onto the strand-shaped object, wherein the measuring radiation is reflected by the strand-shaped object;
   at least one receiving apparatus configured to receive the measuring radiation reflected by the strand-shaped object along the input-output optical axis;
   an evaluation apparatus configured to determine at least one of (1) a diameter and (2) an outer contour of the strand-shaped object based on the measuring radiation received by the at least one receiving apparatus; and
   at least one retroreflector comprising a plurality of discrete reflector portions arranged asymmetrically along a circumferential line relative to the input-output optical axis of the at least one transmission apparatus and the at least one receiving apparatus, wherein delay times of radiation fractions reflected by the plurality of reflector portions are intentionally shifted relative to one another,
   wherein the at least one retroreflector is configured to surround at least a portion of the strand-shaped object, wherein the at least one retroreflector is configured to retroreflect at least some of the measuring radiation reflected by the strand-shaped object.

2. The device according to claim 1, wherein at the least one transmission apparatus and the at least one receiving apparatus are positioned substantially in a same location.

3. The device according to claim 1, wherein the at least one transmission apparatus and the at least one receiving apparatus are formed by at least one transceiver.

4. The device according to claim 1, further comprising a plurality of transmission apparatuses positioned around a circumference of the strand-shaped object and a plurality of receiving apparatuses positioned around the circumference of the strand-shaped object.

5. The device according to claim 1, further comprising at least three transmission apparatuses positioned around a circumference of the strand-shaped object and at least three receiving apparatuses positioned around the circumference of the strand-shaped object, wherein the evaluation apparatus is configured to determine a position of a surface defect on the strand-shaped object from a comparison of the measuring radiation received by the at least three receiving apparatuses.

6. The device according to claim 1, further comprising at least two receiving apparatuses and at least one transmission apparatus arranged between the at least two receiving apparatuses, wherein the evaluation apparatus is configured to determine a position of a surface defect on the strand-shaped object from a temporal comparison of the measuring radiation received by the at least two receiving apparatuses.

7. The device according to claim 1, wherein the at least one retroreflector comprises a cross-section that is at least partially circular in shape.

8. The device according to claim 1, wherein the at least one retroreflector comprises a cross-section that at least partially deviates from a circular shape.

9. The device according to claim 1, wherein the at least one retroreflector comprises a plurality of reflector portions positioned so as to be offset relative to one another in a radial direction.

10. The device according to claim 1, wherein the plurality of reflector portions each comprise a circular cross-section.

11. The device according to claim 1, wherein the measuring radiation emitted by the at least one transmission apparatus is one of (1) terahertz radiation and (1) gigahertz radiation.

12. A method for performing a measurement of a strand-shaped object, the method comprising:
   emitting measuring radiation along an input-output optical axis onto the strand-shaped object using at least one transmission apparatus;
   reflecting the measuring radiation by the strand-shaped object along the input-output optical axis;
   receiving the measuring radiation reflected by the strand-shaped object using at least one receiving apparatus;
   determining at least one of (1) a diameter and (2) an outer contour of the strand-shaped object based on the measuring radiation reflected by the strand-shaped object; and
   retroreflecting at least some of the measuring radiation reflected by the strand-shaped object using at least one retroreflector, wherein the at least one retroreflector comprises a plurality of discrete reflector portions arranged asymmetrically along a circumferential line relative to the input-output optical axis of the at least one transmission apparatus and the at least one receiving apparatus such that delay times of radiation fractions reflected by the reflector portions are intentionally shifted relative to one another.

13. The method of claim 12, wherein the measuring radiation emitted onto the strand-shaped object is one of (1) terahertz radiation and (1) gigahertz radiation.

* * * * *